Nov. 13, 1951  G. H. AKLIN  2,574,995
PHOTOGRAPHIC OBJECTIVE CONSISTING OF THREE SIMPLE
ELEMENTS AND A CEMENTED TRIPLET THEREBEHIND
Filed Aug. 11, 1950  2 SHEETS—SHEET 1
Fig. 1
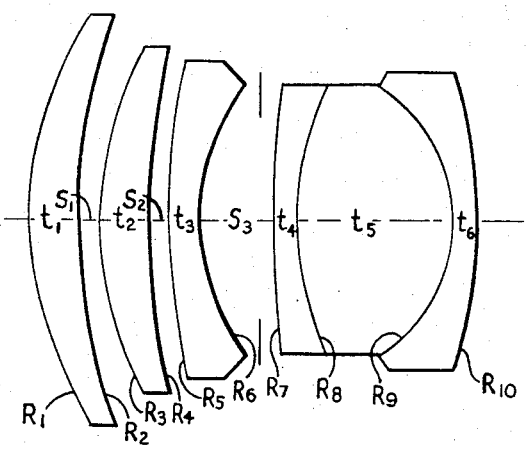
Fig. 2
| EF = 100 mm | | | | f/2.0 |
|---|---|---|---|---|
| Lens | N | V | Radii | Thicknesses |
| 1 | 1.880 | 41.1 | $R_1$=+55.62mm | $t_1$=6.40 mm |
|   |       |      | $R_2$=+91.50   | $S_1$=1.25 |
| 2 | 1.755 | 47.2 | $R_3$=+43.51   | $t_2$=8.40 |
|   |       |      | $R_4$=+131.12  | $S_2$=2.83 |
| 3 | 1.647 | 29.4 | $R_5$=+1176.6  | $t_3$=3.60 |
|   |       |      | $R_6$=+28.60   | $S_3$=10.51 |
| 4 | 1.647 | 29.4 | $R_7$=+1211.8  | $t_4$=2.60 |
| 5 | 1.804 | 41.8 | $R_8$=+44.20   | $t_5$=22.50 |
| 6 | 1.777 | 44.7 | $R_9$=−22.12   | $t_6$=3.51 |
|   |       |      | $R_{10}$=−116.39 | BF=63.7 |
Fig. 4
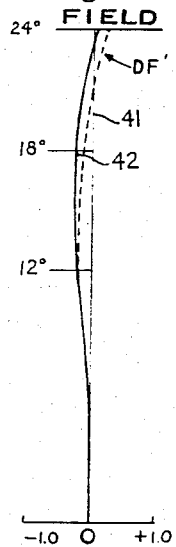
Fig. 3
SPH. ABERR.
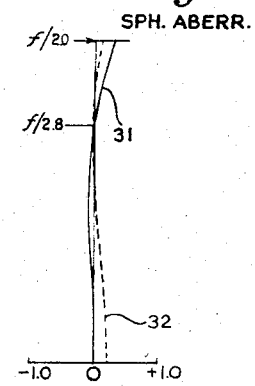
George H. Aklin
INVENTOR
Daniel I. Mayne
BY Harold F. Bennett
ATTY & AGT.

Fig. 5

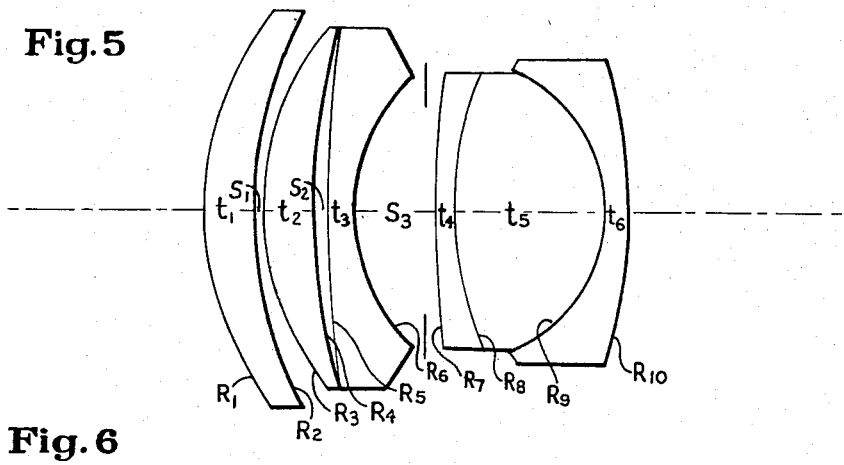

Fig. 6

| EF = 100 mm | | | | f/2.0 |
|---|---|---|---|---|
| Lens | N | V | Radii | Thicknesses |
| 1 | 1.880 | 41.1 | $R_1$=+48.46 mm<br>$R_2$=+73.28 | $t_1$= 6.41 mm<br>$S_1$= .44 |
| 2 | 1.755 | 47.2 | $R_3$=+41.99<br>$R_4$=+131.05 | $t_2$=8.41<br>$S_2$=2.14 |
| 3 | 1.647 | 29.4 | $R_5$=+829.7<br>$R_6$=+27.16 | $t_3$=3.59<br>$S_3$=10.90 |
| 4 | 1.649 | 33.8 | $R_7$=+312.8 | $t_4$= 2.60 |
| 5 | 1.777 | 44.7 | $R_8$=+44.13 | $t_5$=21.71 |
| 6 | 1.745 | 45.6 | $R_9$=−21.92<br>$R_{10}$=−133.99 | $t_6$ = 3.79<br>BF= 62.8 |

Fig. 7

| EF = 100 mm | | | | f/2.0 |
|---|---|---|---|---|
| Lens | N | V | Radii | Thicknesses |
| 1 | 1.880 | 41.1 | $R_1$=+50.30 mm<br>$R_2$=+76.00 | $t_1$= 6.40 mm<br>$S_1$= .44 |
| 2 | 1.697 | 56.2 | $R_3$=+40.02<br>$R_4$=+162.40 | $t_2$=10.00<br>$S_2$=1.56 |
| 3 | 1.615 | 31.9 | $R_5$=+1007.5<br>$R_6$=+26.24 | $t_3$=3.60<br>$S_3$=12.90 |
| 4 | 1.649 | 33.8 | $R_7$=+238.56 | $t_4$= 3.00 |
| 5 | 1.777 | 44.7 | $R_8$=+52.58 | $t_5$=21.30 |
| 6 | 1.745 | 43.8 | $R_9$=−21.74<br>$R_{10}$=−164.24 | $t_6$ = 3.80<br>BF= 58.7 |

George H. Aklin
INVENTOR
BY Daniel J. Mayne
Harold F. Bennett
ATT'Y & AGT

Patented Nov. 13, 1951

2,574,995

UNITED STATES PATENT OFFICE 2,574,995

PHOTOGRAPHIC OBJECTIVE CONSISTING OF THREE SIMPLE ELEMENTS AND A CEMENTED TRIPLET THEREBEHIND

George H. Aklin, Rochester, N. Y., assignor to Eastman Kodak Company, Rochester, N. Y., a corporation of New Jersey Application August 11, 1950, Serial No. 178,860

2 Claims. (Cl. 88—57)

This invention relates to photographic objectives of the type consisting of three simple elements in front of the diaphragm and a cemented triplet therebehind, the cemented triplet consisting of a biconvex element between two negative elements.

The object of the invention is to provide an objective of this type which is very highly corrected for spherical aberration, coma, astigmatism, curvature of field, and oblique spherical aberration or rim rays.

Objectives of the above-described type in which the two front components are simple positive menisci convex to the front and the third component is a simple negative element concave to the rear have been among the most successful for use on miniature cameras and cover a field of about 24° from the axis at an aperture of f/2. Known objectives of this type give a very sharp image at the axis, but a critical examination of the image shows considerable loss of detail near the edge of the field due to astigmatism.

According to the present invention, the zonal spherical aberration and the oblique spherical aberration are improved and the astigmatism is almost completely corrected out to 24° from the axis, by making the third element, which is negative, of a glass which has a lower refractive index than the average refractive index of the positive elements and by means of certain preferred features of curvature relationships, all of which features cooperate to produce a highly corrected objective. In order to take full advantage of this novel index relationship, I find it advantageous to make the radius of curvature of the front surface of the front component greater than one-half that of the rear surface thereof and less than the focal length F of the objective as a whole, to make the radius of curvature of the rear surface of the second component greater than F and less than one-fourth the absolute value of the radius of curvature of the front surface of the third component, and to give the front surface of the rear component a very weak curvature, preferably between $-0.2/F$ and $+0.5/F$. As is customary, a negative curvature denotes concavity to the front and a positive curvature denotes convexity to the front. With respect to the compound rear component, I find it preferable to make the refractive index of the biconvex element the highest of the three and that of the front negative element the lowest, and to make the rear surface of the biconvex element more strongly curved than the front surface thereof. These known features of the rear component aid in controlling the curvature of field and distortion. I find that the sum of the curvatures of the two cemented surfaces should be between 5 and 8 times the reciprocal of the focal length of the objective for the best correction of oblique spherical aberration. Preferably the refractive index of the biconvex element is between 1.7 and 1.95. By making the over-all length of the objective from the front surface of the front component to the rear surface of the rear component between 0.5F and 0.75F, I am able to get very good illumination at the edges of the field. To obtain over-all lengths in this range, I make the sum of the three air spaces between 0.08F and 0.2F.

In a highly preferred form of the invention the refractive indices N of the lens elements for the D line of the spectrum and the radii of curvature R of the lens surfaces each numbered by subscripts from front to rear are within the limits set forth by the following algebraic inequalities:

| | | |
|---|---|---|
| $1.75 <$ | $N_1$ | $< 1.95$ |
| $1.62 <$ | $N_2$ | $< 1.85$ |
| $1.55 <$ | $N_3$ | $< 1.68$ |
| $1.60 <$ | $N_4$ | $< 1.75$ |
| $0.10 <$ | $(N_5 - N_4)$ | $< 0.20$ |
| $0.01 <$ | $(N_5 - N_6)$ | $< 0.06$ |
| $0.4F <$ | $R_1$ | $< 0.65F$ |
| $0.6F <$ | $R_2$ | $< 1.5F$ |
| $0.36F <$ | $R_3$ | $< 0.55F$ |
| $F <$ | $R_4$ | $< 3F$ |
| $4F <$ | $R_5$ | $< \infty$ |
| $0.2F <$ | $R_6$ | $< 0.4F$ |
| $\frac{-1}{5F} <$ | $\frac{1}{R_7}$ | $< \frac{+1}{2F}$ |
| $0.36F <$ | $R_8$ | $< 0.65F$ |
| $-0.3F <$ | $R_9$ | $< -0.17F$ |
| $-3F <$ | $R_{10}$ | $< -0.9F$ |

It will be noted that the refractive indices of the two rear elements are defined relative to the index of an adjacent element rather than relative to air. This is because the index differences at the cemented surfaces are more critical to the best working of the invention than the particular values of the indices themselves. It will also be noted that $R_7$ is defined by its reciprocal. This is merely a matter of convenience as the surface may be either convex or concave or plane; thus the value of the curvature $1/R_7$ is within the range from $-1/5F$ to $+1/2F$.

In the accompanying drawings:

Figs. 1 and 5 show objectives according to the invention.

Figs. 2, 6 and 7 show constructional data for specific examples of the same, and Figs. 3 and 4 show aberration curves for the example shown in Figs. 1 and 2.

The data given in Figs. 2, 6 and 7 is repeated below for convenience. In these tables of data the lens elements are numbered in the first column in order from front to rear, the respective refractive indices N for the D line of the spectrum and the dispersive indices V are given in the second and third columns, and in the last two columns the radii of curvature R of the lens surfaces, the thicknesses $t$ of the lens elements and the spaces $s$ between the lens components are given, each being numbered in order from front to rear. Also, the back focal length BF of the objective is given.

Example 1, Figs. 1 and 2

EF = 100 mm.    f/2.0

| Lens | N | V | Radii | Thicknesses |
|---|---|---|---|---|
| 1 | 1.880 | 41.1 | $R_1 = +\ 55.62$ mm.<br>$R_2 = +\ 91.50$ | $t_1 = 6.40$ mm.<br>$s_1 = 1.25$ |
| 2 | 1.755 | 47.2 | $R_3 = +\ 43.51$<br>$R_4 = +131.12$ | $t_2 = 8.40$<br>$s_2 = 2.83$ |
| 3 | 1.647 | 29.4 | $R_5 = +1176.6$<br>$R_6 = +\ 28.60$ | $t_3 = 3.60$<br>$s_3 = 10.51$ |
| 4 | 1.647 | 29.4 | $R_7 = +1211.8$ | $t_4 = 2.60$ |
| 5 | 1.804 | 41.8 | $R_8 = +\ 44.20$ | $t_5 = 22.50$ |
| 6 | 1.777 | 44.7 | $R_9 = -\ 22.12$<br>$R_{10} = -\ 116.39$ | $t_6 = 3.51$<br>BF = 63.7 |

Example 2, Figs. 5 and 6

EF = 100 mm.    f/2.0

| Lens | N | V | Radii | Thicknesses |
|---|---|---|---|---|
| 1 | 1.880 | 41.1 | $R_1 = +\ 48.46$ mm.<br>$R_2 = +\ 73.28$ | $t_1 = 6.41$ mm.<br>$s_1 = 0.44$ |
| 2 | 1.755 | 47.2 | $R_3 = +\ 41.99$<br>$R_4 = +131.05$ | $t_2 = 8.41$<br>$s_2 = 2.14$ |
| 3 | 1.647 | 29.4 | $R_5 = +829.7$<br>$R_6 = +\ 27.16$ | $t_3 = 3.59$<br>$s_3 = 10.90$ |
| 4 | 1.649 | 33.8 | $R_7 = +312.8$ | $t_4 = 2.60$ |
| 5 | 1.777 | 44.7 | $R_8 = +\ 44.13$ | $t_5 = 21.71$ |
| 6 | 1.745 | 45.6 | $R_9 = -\ 21.92$<br>$R_{10} = -133.99$ | $t_6 = 3.79$<br>BF = 62.8 |

Example 3, Figs. 5 and 7

EF = 100 mm.    f/2.0

| Lens | N | V | Radii | Thicknesses |
|---|---|---|---|---|
| 1 | 1.880 | 41.1 | $R_1 = +\ 50.30$ mm.<br>$R_2 = +\ 76.00$ | $t_1 = 6.40$ mm.<br>$s_1 = .44$ |
| 2 | 1.697 | 56.2 | $R_3 = +\ 40.02$<br>$R_4 = +162.40$ | $t_2 = 10.00$<br>$s_2 = 1.56$ |
| 3 | 1.615 | 31.9 | $R_5 = +1007.5$<br>$R_6 = +\ 26.24$ | $t_3 = 3.60$<br>$s_3 = 12.90$ |
| 4 | 1.649 | 33.8 | $R_7 = +\ 238.56$ | $t_4 = 3.00$ |
| 5 | 1.777 | 44.7 | $R_8 = +\ 52.58$ | $t_5 = 21.30$ |
| 6 | 1.745 | 43.8 | $R_9 = -\ 21.74$<br>$R_{10} = -\ 164.24$ | $t_6 = 3.80$<br>BF = 58.7 |

In these examples the over-all lengths of the objectives are respectively 0.616F, 0.600F and 0.630F, and the sum of the curvatures of the two cemented surfaces is 6.7, 6.8 and 6.5 respectively times the reciprocal of the focal length of the objective in accordance with the invention. It will be directly evident from these tables that each example also embodies all the other features of the invention described above.

Lens elements 3 and 4 in Example 1 and lens element 3 in each of Examples 2 and 3 are fluosilicate glasses broadly of the type described in Patent No. 2,481,701, Sun, issued September 13, 1949. All the other elements are made of standard commercial glasses including some of the high index borate crown glasses produced by the Eastman Kodak Company. With a slight adjustment in curvatures, if desired, element 3 may be made of potassium bromide crystal, which has optical properties favorable for the correction of secondary spectrum.

Fig. 3 is a graph showing the spherical aberration of Example 1. Curve 31 shows the aberration for the G' spectral line and curve 32 shows the aberration for the D spectral line. The maximum spherical aberration is less than one-third of a millimeter.

Fig. 4 is a graph showing the curvature of field and astigmatism of Example 1. Curve 41 shows the primary curvature of field and curve 42 shows the secondary curvature of field. The difference between these curves represents the astigmatism. The great improvement due to the invention is shown by the fact that these two curves 41 and 42 parallel each other very closely out to the edge of the field and do not diverge rapidly beyond a nodal point as is usual in anastigmatic photographic objectives.

In Examples 2 and 3 the second air space is less than that of Example 1 and the second and third elements are in marginal contact for convenience in mounting.

What I claim is:

1. A photographic objective consisting of four air-spaced components enclosing a diaphragm, the front two being simple positive menisci convex to the front, the third being a simple negative element with its rear surface more strongly curved than its front surface, the fourth being a cemented triplet positive in power and convex to the rear, consisting of a biconvex element between two negative elements of which three cemented elements the center one has the highest refractive index and the front one the lowest, characterized by the refractive index of the simple third component being lower than the average of the refractive indices of the three positive elements, by the radius of curvature of the front surface of the front component being greater than one-half that of the rear surface thereof and less than the focal length F of the objective as a whole, by the radius of curvature of the rear surface of the second component being greater than F and less than one-fourth the absolute value of the radius of curvature of the front surface of the third component, by the curvature $1/R_7$ of the front surface of the rear component being between $-0.2/F$ and $+0.5/F$, a negative curvature denoting concavity to the front and a positive curvature denoting convexity to the front, by the curvature of the rear surface of the biconvex element being numerically greater than that of the front surface thereof and the numerical sum of these two curvatures being between 5/F and 8/F, by the sum of the three air spaces being between 0.08F and 0.2F and by the over-all length from the front surface of the front component to the rear surface of the rear component being between 0.5F and 0.75F.

2. A photographic objective highly corrected for spherical aberration, coma, curvature of field, astigmatism, and distortion, consisting of four axially aligned optical components enclosing a diaphragm, of which components the front three are in front of the diaphragm and are simple lens elements concave to the rear and the rear one is a cemented triplet made up of a biconvex element between two negative elements, in which the refractive indices N of the lens elements for the D line of the spectrum and the radii of curvature R of the lens surfaces each numbered by subscripts from front to rear are within the limits set forth by the following algebraic inequalities:

| | | |
|---|---|---|
| $1.75 <$ | $N_1$ | $< 1.95$ |
| $1.62 <$ | $N_2$ | $< 1.85$ |
| $1.55 <$ | $N_3$ | $< 1.68$ |
| $1.60 <$ | $N_4$ | $< 1.75$ |
| $0.10 <$ | $(N_5 - N_4)$ | $< 0.20$ |
| $0.01 <$ | $(N_5 - N_6)$ | $< 0.06$ |
| $0.4F <$ | $R_1$ | $< 0.65F$ |
| $0.6F <$ | $R_2$ | $< 1.5F$ |
| $0.36F <$ | $R_3$ | $< 0.55F$ |
| $F <$ | $R_4$ | $< 3F$ |
| $4F <$ | $R_5$ | $< \infty$ |
| $0.2F <$ | $R_6$ | $< 0.4F$ |
| $\frac{-1}{5F} <$ | $\frac{1}{R_7}$ | $< \frac{+1}{2F}$ |
| $0.36F <$ | $R_8$ | $< 0.65F$ |
| $-0.3F <$ | $R_9$ | $< -0.17F$ |
| $-3F <$ | $R_{10}$ | $< -0.9F$ | where F is the focal length of the objective as a whole and where + and − values of the radii denote surfaces respectively convex and concave to the front, and in which the sum of the three air spaces between the components is between 0.08F and 0.2F and the length of the objective from the front surface of the front component to the rear surface of the rear component is between 0.5F and 0.75F.

GEORGE H. AKLIN.

REFERENCES CITED

The following references are of record in the file of this patent:

UNITED STATES PATENTS

| Number | Name | Date |
|---|---|---|
| 2,164,028 | Berek | June 27, 1939 |
| 2,397,565 | Schade | Apr. 2, 1946 |

FOREIGN PATENTS

| Number | Country | Date |
|---|---|---|
| 408,787 | Great Britain | Apr. 19, 1934 |
| 561,156 | Great Britain | May 8, 1944 |
| 897,540 | France | May 30, 1944 |